US011189884B2

(12) United States Patent
Guo et al.

(10) Patent No.: US 11,189,884 B2
(45) Date of Patent: Nov. 30, 2021

(54) CELL AND BATTERY

(71) Applicant: Ningde Amperex Technology Limited, Fujian (CN)

(72) Inventors: Peipei Guo, Fujian (CN); Ping He, Fujian (CN); Yejun Peng, Fujian (CN); Wenqiang Cheng, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 163 days.

(21) Appl. No.: 16/546,324

(22) Filed: Aug. 21, 2019

(65) Prior Publication Data
US 2020/0136116 A1 Apr. 30, 2020

(30) Foreign Application Priority Data

Oct. 25, 2018 (CN) .......................... 201811252452.3

(51) Int. Cl.
*H01M 2/16* (2006.01)
*H01M 50/449* (2021.01)
*H01M 50/463* (2021.01)

(52) U.S. Cl.
CPC ....... *H01M 50/449* (2021.01); *H01M 50/463* (2021.01)

(58) Field of Classification Search
CPC ............. H01M 50/449; H01M 50/463; H01M 50/411; H01M 10/0585; H01M 10/0587; Y02E 60/10
See application file for complete search history.

(56) References Cited

U.S. PATENT DOCUMENTS

| 1,339,853 | A | * | 5/1920 | Luthy | H01M 50/463 429/129 |
| 2,117,382 | A | * | 5/1938 | Wells | H01M 50/463 429/143 |
| 4,927,722 | A | * | 5/1990 | Bohnstedt | H01M 50/463 429/147 |
| 5,230,968 | A | * | 7/1993 | Bones | H01M 10/39 429/139 |
| 5,985,484 | A | * | 11/1999 | Young | H01M 50/463 429/143 |
| 6,001,503 | A | * | 12/1999 | Hercamp | H01M 50/463 429/139 |
| 6,475,665 | B1 | * | 11/2002 | Okamoto | H01M 50/463 429/139 |
| 2002/0076615 | A1 | * | 6/2002 | Tanaka | H01M 50/411 429/249 |

(Continued)

*Primary Examiner* — Michael L Dignan
(74) *Attorney, Agent, or Firm* — Westerman, Hattori, Daniels & Adrian, LLP

(57) ABSTRACT

The present application discloses a cell and a battery, the cell comprising a first electrode, a second electrode, and a first separator and a second separator that are disposed between the first electrode and second electrode, wherein the first separator includes a first meshing structure beyond the first electrode and the second electrode, the second separator includes a second meshing structure beyond the first electrode and the second electrode, and the first meshing structure is meshed with the second meshing structure along a thickness direction of the cell. The cell provided by the present application can improve the dropping performance of the cell and enhance the safe use of cell.

19 Claims, 10 Drawing Sheets

(56) References Cited

U.S. PATENT DOCUMENTS

| | | | | |
|---|---|---|---|---|
| 2008/0187825 A1* | 8/2008 | Kawabata | ........... | H04M 15/745 |
| | | | | 429/144 |
| 2012/0021272 A1* | 1/2012 | Kramm | ............... | H01M 50/463 |
| | | | | 429/139 |
| 2017/0110703 A1* | 4/2017 | Kojima | ............. | H01M 10/0525 |

* cited by examiner

CELL AND BATTERY

CROSS-REFERENCE TO RELATED APPLICATION

This application claims priority to and benefits of Chinese Patent Application Serial No. 201811252452.3, filed with the China National Intellectual Property Administration on Oct. 25, 2018, the entire content of which is incorporated herein by reference.

FIELD OF THE INVENTION

The present application relates to electrochemical devices, in particular, to a cell and a battery with the cell.

BACKGROUND OF THE INVENTION

Due to the portability of the battery, most mobile devices such as cell phones and laptops are powered by secondary batteries. In addition, as alternative energy sources for fossil fuels for electric vehicles, hybrid vehicles and the like, the secondary batteries have been actively developed. Batteries have been widely used in advanced consumer electronics field such as laptops, mobile phones and digital cameras. Electronic products often drop during use, which makes the requirements for dropping performance of the cells in the electronic products higher and higher. Therefore, there is a need for a battery structure that can improve the safety of the battery when dropping.

SUMMARY OF THE INVENTION

For the problems in the related technologies, the present application intends to provide a cell and a battery, so as to improve the dropping performance of the cell and enhance the safe use of cell.

The present application is implemented as follows:

According to one aspect of present application, provides a cell, including a first electrode; a second electrode; a first separator and a second separator disposed between the first electrode and second electrode; wherein the first separator includes a first meshing structure beyond the first electrode and the second electrode, the second separator includes a second meshing structure beyond the first electrode and the second electrode; the first meshing structure is meshed with the second meshing structure along a thickness direction of the cell.

According to embodiments of the present application, the first meshing structure includes a first protrusion and a first receiving space, and the first receiving space is formed on a back surface of the first protrusion; the second meshing structure includes a second protrusion and a second receiving space, and the second receiving space is formed on a back surface of the second protrusion; the second protrusion is meshed with the first receiving space, or the first protrusion is meshed with the second receiving space.

According to embodiments of the present application, the first meshing structure further includes a third protrusion and a third receiving space, and the third receiving space is formed on a back surface of the third protrusion; the second meshing structure further includes a fourth protrusion and a fourth receiving space, the fourth receiving space is formed on a back surface of the fourth protrusion; the third protrusion is meshed with the fourth receiving space.

According to embodiments of the present application, a convex direction of the first protrusion is opposite to a convex direction of the third protrusion.

According to embodiments of the present application, a convex direction of the second protrusion is opposite to a convex direction of the fourth protrusion.

According to embodiments of the present application, an opening is formed between the first protrusion and the first separator.

According to embodiments of the present application, an opening is formed on top of the first protrusion.

According to embodiments of the present application, the first meshing structure has a first maximum thickness, the first separator has a third thickness at where not provided with the first meshing structure; the first maximum thickness is less than the third thickness.

According to embodiments of the present application, the second meshing structure has a second maximum thickness, the second separator has a third thickness at where not provided with the second meshing structure; the second maximum thickness is less than the third thickness.

According to embodiments of the present application, the third protrusion is disposed between two adjacent first protrusions.

According to embodiments of the present application, the first protrusion and the second protrusion have a cross-sectional shape of any one of a circle shape and a polygon shape in a plane perpendicular to the thickness direction of the cell.

According to embodiments of the present application, the first protrusion and the second protrusion have a cross-sectional shape of any one of a triangle shape, a trapezoidal shape, a zigzag shape, and an arc shape in a plane perpendicular to a length direction of the cell.

According to embodiments of the present application, the first meshing structure is disposed discontinuously along a length direction of the cell.

According to embodiments of the present application, the first meshing structure is disposed continuously along a length direction of the cell.

According to embodiments of the present application, a plurality of first protrusions have the same shape and same size.

According to embodiments of the present application, a plurality of first protrusions are convex in a same direction.

According to embodiments of the present application, a plurality of openings have a cross-section shape of circular.

According to embodiments of the present application, a plurality of openings have a cross-section shape of polygonal.

According to embodiments of the present application, the first electrode is a positive electrode and the second electrode is a negative electrode; or the first electrode is a negative electrode and the second electrode is a positive electrode.

According to another aspect of present application, provides a battery including the cell above.

The present application provides a cell that may improve the dropping performance, since the separator is provided with the meshing structure, the bonding force is produced between multilayers of separators when the cell 10 drops with the electronic product, so that the separator may not shrink by the impact of the electrolyte, the dropping performance of the cell is improved, the safe use of cell is enhanced.

BRIEF DESCRIPTION OF THE DRAWINGS

In order to illustrate the technical schemes in the embodiments of the present application or in the prior art more clearly, the drawings which are required to be used in the description of the embodiments of the present disclosure are briefly described below, it is obvious that the drawings described below are only some embodiments of the present application, it is apparent to those of ordinary skill in the art that other drawings may be obtained based on accompanying drawings without inventive effort.

DETAILED DESCRIPTION OF THE EMBODIMENTS

Figure 1A:
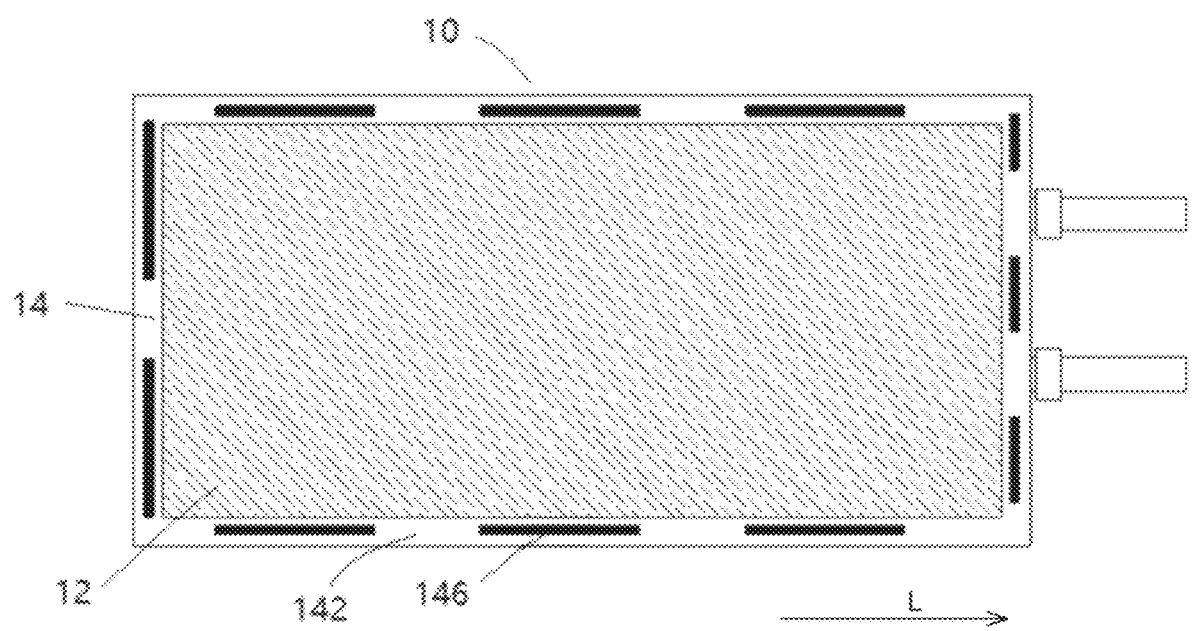
FIG. 1A is a schematic top view of a cell according to an embodiment of the present application.

The technical schemes of the embodiments of the present disclosure will be clearly and completely described in the following with reference to the accompanying drawings, it is obvious that the embodiments to be described are only a part rather than all of the embodiments of the present disclosure. Based on the embodiments of the present application, all the other embodiments obtained by those of ordinary skill in the art are within the scope of the present application.

In the description of this application, it should be understood that the direction or position relationship indicated by the terms 'length', 'width', 'thickness', 'up', 'down', 'left', 'right', 'upright', 'horizontal', 'top', 'bottom', 'inside', 'outside', 'axial', 'radial', 'circumferential' etc. is based on drawings, just to facilitate and simplify the description of this application rather than indicating or implying that the device or assembly must have specific direction or be structured or operated in specific direction, so it shall not be regarded as a limitation on this application. In addition, the feature defined by 'first', 'second' can explicitly or implicitly include one or more feature s. In this application, unless otherwise stated, the meaning of 'a plurality of' is two or more.

The embodiments of the present application will be specifically described below in conjunction with the accompanying drawings. It should be noted that the same components in the various drawings have the same reference numerals. The various embodiments below may be combined or partially replaced with each other in any way possible.

With the development of high energy density cells, the free electrolyte inside the cell is relatively increased. With the electronic product drops, the free electrolyte built into the cell will strongly impact the separator between the positive electrode and the negative electrode around the cell to shrink along the impact direction of the electrolyte, thereby causing a short circuit between the positive electrode and the negative electrode to produce a safety problem such as heating or even ignition of the cell. In order to solve the shrinkage problem of the separator by impact during dropping, one solution is to bond the separators to each other by hot-pressing the separators, however this solution is not suitable for separators coated with ceramics, and the thermal effects of the hot-pressing may cause the risk of closed-pore to the nearby separators.

Figure 1B:
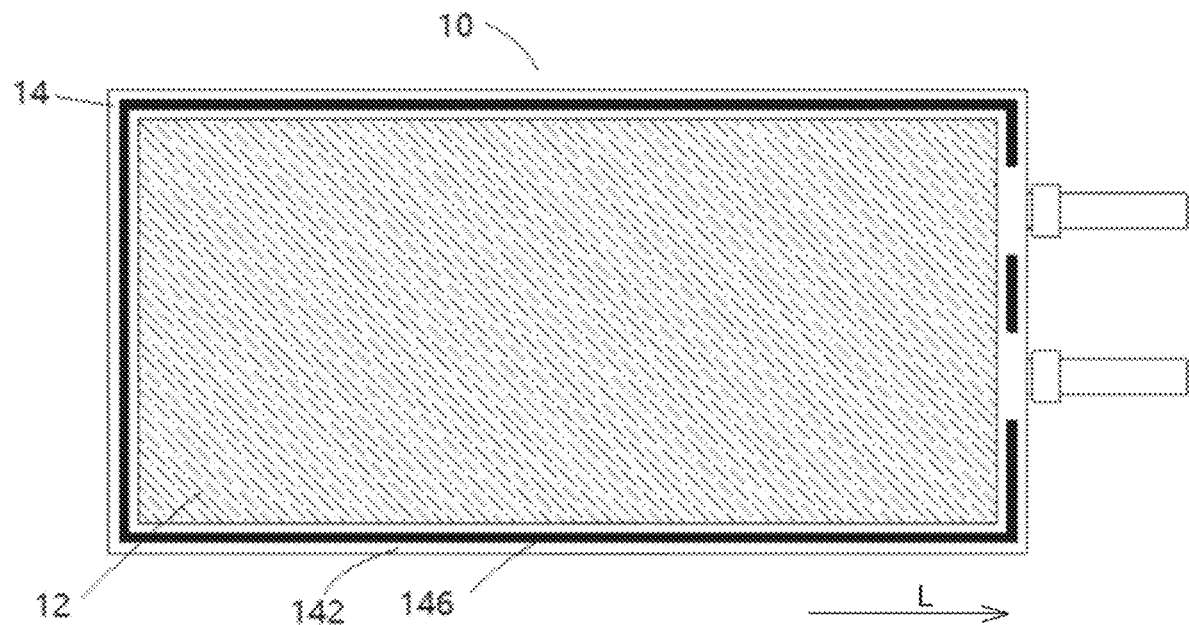
FIG. 1B is a schematic top view of a cell according to an embodiment of the present application.
Figure 2:
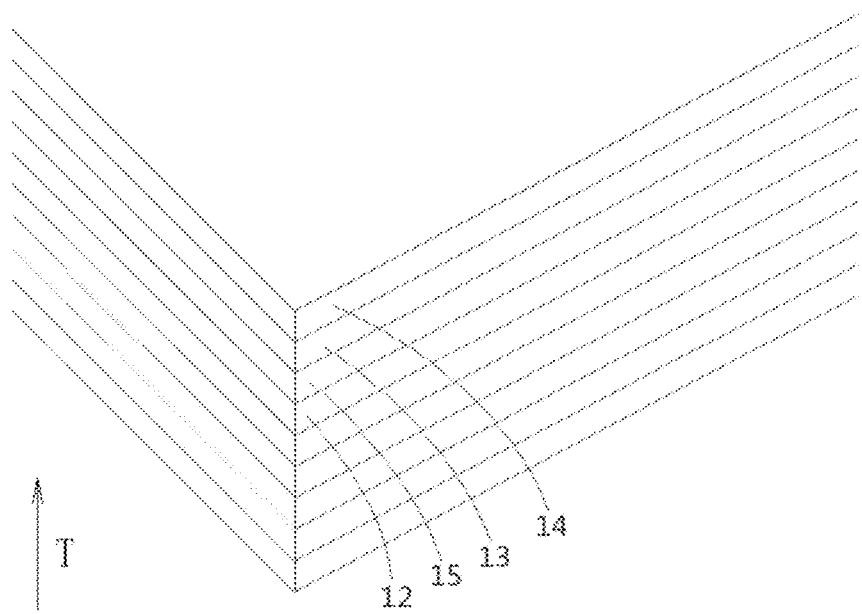
FIG. 2 is a schematic view of a stack of a first electrode, a first separator, a second electrode and a second separator according to an embodiment of the present application.

Referring to FIG. 1A to FIG. 2, the present application provides a cell 10, the cell 10 includes a first electrode 12, a second electrode 13, a first separator 14 and a second separator 15, the first separator 14 and the second separator 15 are disposed between the first electrode 12 and the second electrode 13 to separate the first electrode 12 from the second electrode 13. It should be understood here that although the cell 10 is constructed as a laminated cell shown in the embodiment in FIGS. 1A and 1B, in an alternative embodiment the cell may also be a wound cell. That is to say, the specific types of the cell are not intended to be limiting of the present application.

With reference to FIG. 1A to FIG. 3C, the first separator 14 includes a first meshing structure 146 beyond the first electrode 12 and the second electrode 13, the second separator 15 includes a second meshing structure 148 beyond the first electrode 12 and the second electrode 13. The first meshing structure 146 is meshed with the second meshing structure 148 along a thickness direction T (a direction perpendicular to the plane wherein the first separator 14 is located) of the cell 10. It should be understood that the positions and structures of the second meshing structure 148 of the second separator 15 may be same as or may be different from those of the first meshing structure 146 of the first separator 14. The first meshing structure 146 is meshed with the second meshing structure 148 to form bonding force between the first separator 14 and the second separator 15, so that the first separator 14 and the second separator 15 are mutually restrained to prevent the first separator 14 or the second separator 15 from shrinking into a gap between the first electrode 12 and the second electrode 13.

The present application provides a cell 10 that may improve the dropping performance, since the separator is provided with the meshing structure, the binding force is produced between multilayers of separators when the cell 10 drops with the electronic product, so that the separator may not shrink by the impact of the electrolyte, the dropping performance of the cell is improved, the safe use of cell is enhanced.

Wherein, when the first electrode 12 is a positive electrode, the second electrode 13 is a negative electrode; when the first electrode 12 is a negative electrode, the second electrode 13 is a positive electrode. The first separator 14 and the second separator 15 beyond the first electrode 12 and the second electrode 13, so that a short circuit caused by the contact between the first electrode 12 and the second electrode 13 may be effectively prevented. The positive electrode includes a positive electrode current collector and a positive electrode active material layer of a lithium-based oxide coated on the surface of the positive electrode current collector. The negative electrode includes a negative electrode current collector and a negative electrode active substance disposed on the negative electrode current collector. The negative electrode current collector is an aluminum foil, the negative electrode active substance includes carbon material. The separator is disposed between the positive electrode and the negative electrode to provide insulation. The separator may be formed of polyethylene, polypropylene or a combination of polyethylene and polypropylene. The separator allows lithium ions to be exchanged between the two electrodes.

As shown in FIG. 1A, the first meshing structure 146 is disposed discontinuously. As shown in FIG. 1B, the first meshing structure 146 is disposed continuously along a length direction L of the cell 10. It should be understood that the arrangement of the first meshing structure 146 shown in FIG. 1A and FIG. 1B is exemplary. The first meshing structure 146 may be disposed according to actual conditions, and the second meshing structure of the second separator is disposed in a same manner as the first meshing structure 146.

In some embodiments, the first meshing structure 146 of the first separator 14 has a first maximum thickness, the second meshing structure 148 of the second separator 15 has a second maximum thickness, the first separator 14 has a third thickness at where the first meshing structure 146 is not provided, the second separator 15 has the third thickness at where the second meshing structure 148 is not provided. In some embodiments, the first maximum thickness is less than the third thickness, and the second maximum thickness is less than the third thickness. That is to say, the thickness of the meshing structure is less than the thickness of the separator at where the meshing structure is not provided.

The meshing structure of the cell of the present application will be described below by various embodiments.

Embodiment 1

Figure 3A:
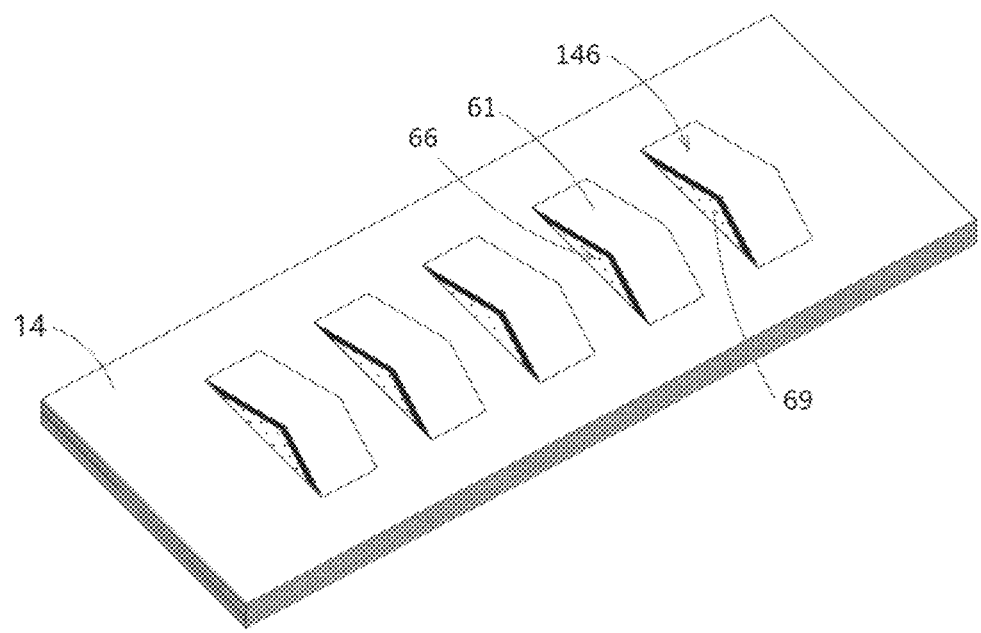
FIG. 3A is a perspective view of a first meshing structure of a cell according to an embodiment of the present application.
Figure 3B:
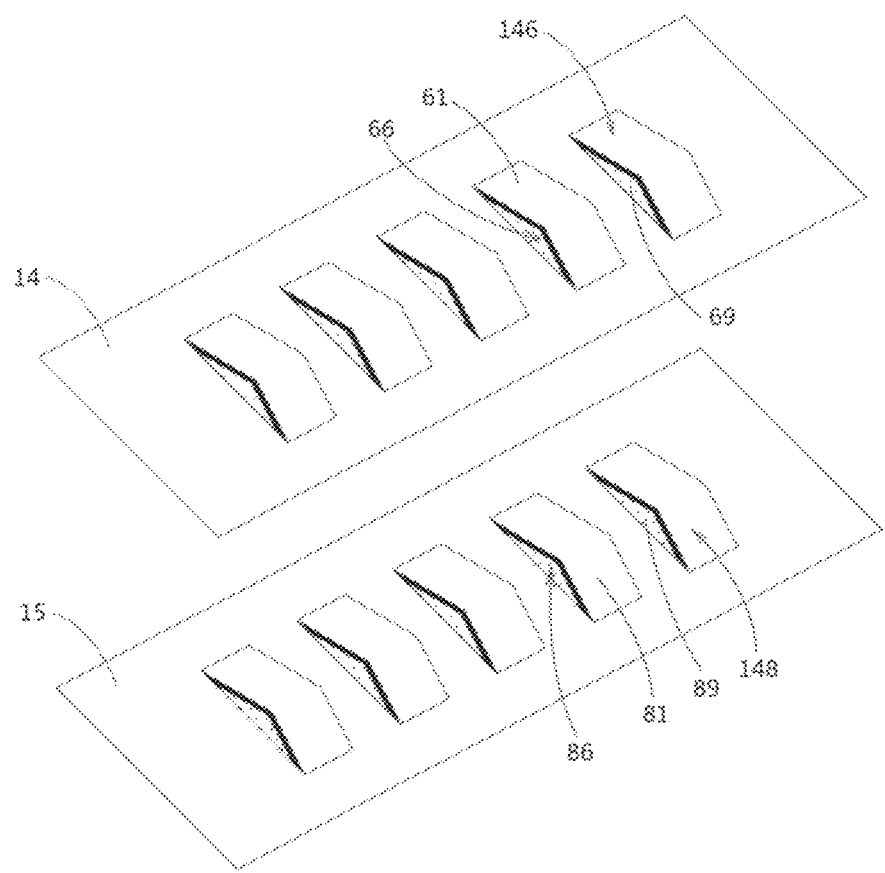
FIG. 3B is a schematic view of a state before a first meshing structure is meshed with the second meshing structure according to an embodiment of the present application.
Figure 3C:
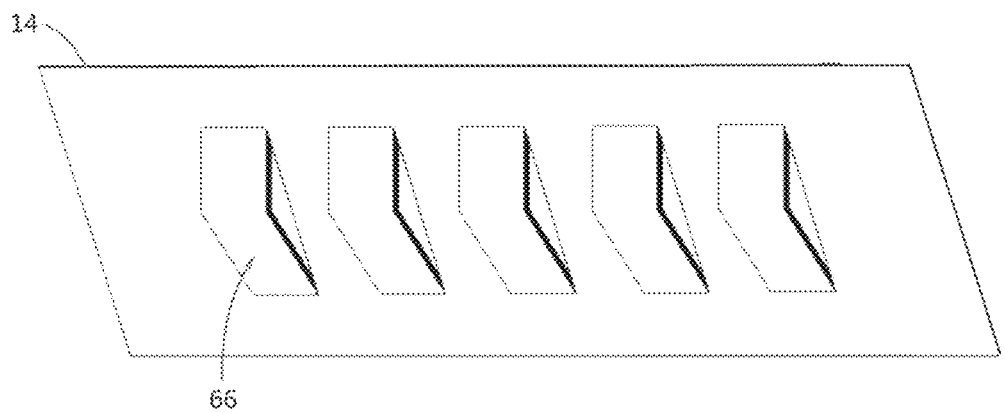
FIG. 3C is a schematic upward view of a first separator in FIG. 3A.

Referring to FIG. 3A to FIG. 3D, the first meshing structure 146 includes first protrusions 61 that protrude from the plane where the first separator 14 is located. In some embodiments, a plurality of first protrusions 61 have the same shape and same size. FIG. 3A shows that the first protrusions 61 are convex upward in a direction perpendicular to the plane of the separator 14. In another embodiment, the first protrusions 61 may be convex downward in a direction perpendicular to the plane of the separator 14. Since the plurality of first protrusions 61 of the meshing structure 146 are convex in the same direction, such a meshing structure 146 may also be referred to an unidirectional meshing structure.

The first meshing structure 146 further includes first receiving spaces 66 formed on a back surface of the first protrusions 61, with reference to FIG. 3A to FIG. 3D, the first receiving space 66 refers to a space located under the back surface of the first protrusion 61. It should be understood that the back surface of the first protrusion 61 is a surface opposite to the convex direction of the first protrusion 61. Correspondingly, the second meshing structure 148 of the second separator 15 located under the first separator 14 includes second protrusions 81 and second receiving spaces 86, the second receiving spaces 86 are formed on a back surface of the second protrusions 81. And, the second protrusions 81 of the second separator 15 are meshed with the first receiving spaces 66 of the first separator 14, so as to prevent the separator from shrinking. In another embodiment, the first protrusions 61 of the first separator 14 may be meshed with the second receiving spaces 86 of the second meshing structure 148 of the second separator 15, so as to prevent the separator from shrinking.

In an embodiment, openings 69 may be formed between the first protrusions 61 and the first separator 14, openings 89 may be formed between the second protrusions 81 and the second separator 15. It is advantageous to form binding force between the multilayers of separators by using a meshing structure with openings.

Figure 3D:
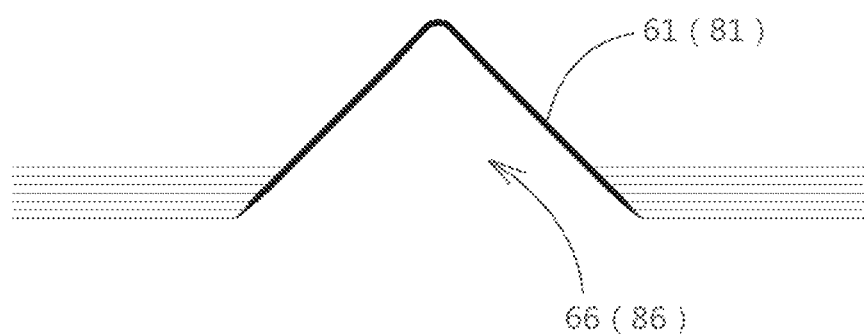
FIG. 3D is a cross-sectional view of a first protrusion in FIG. 3A.
Figure 4A:
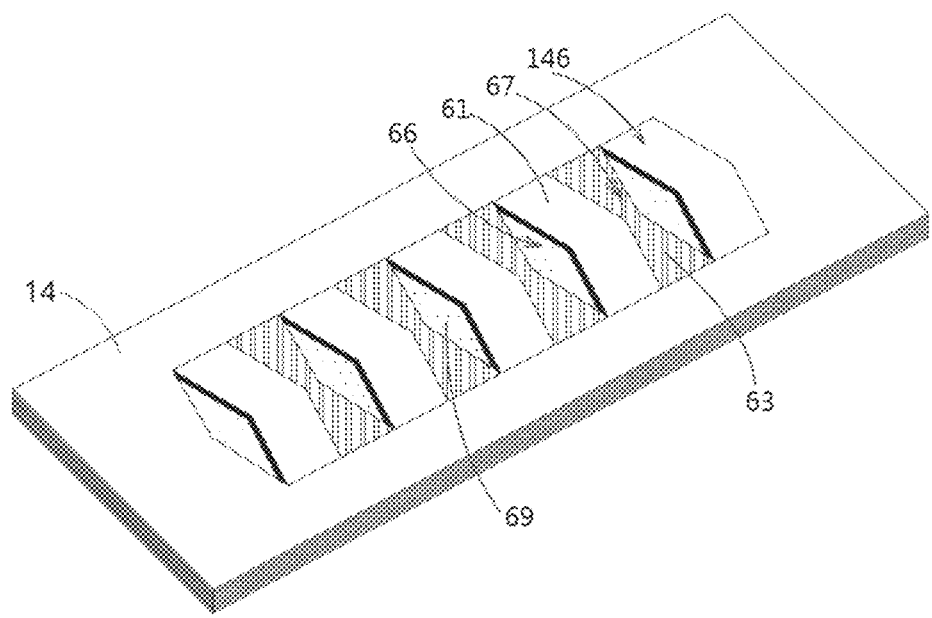
FIG. 4A is a perspective view of a first meshing structure of a cell according to an embodiment of the present application.
Figure 4B:
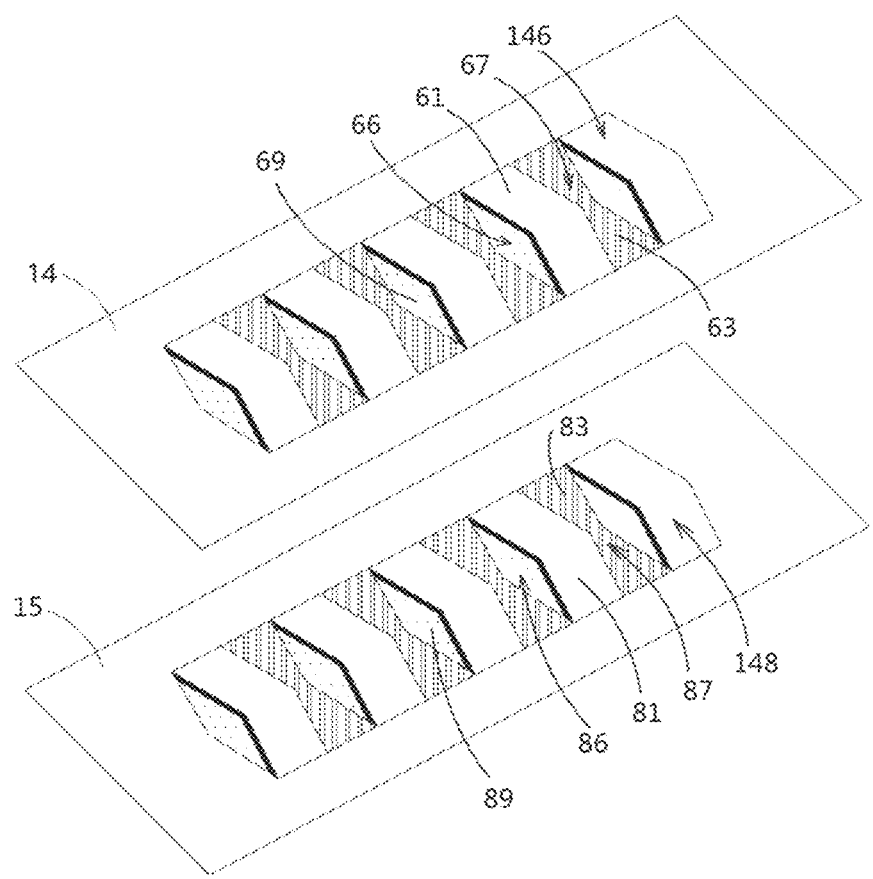
FIG. 4B is a schematic view of a state before the first meshing structure is meshed with the second meshing structure according to an embodiment of the present application.
Figure 4C:
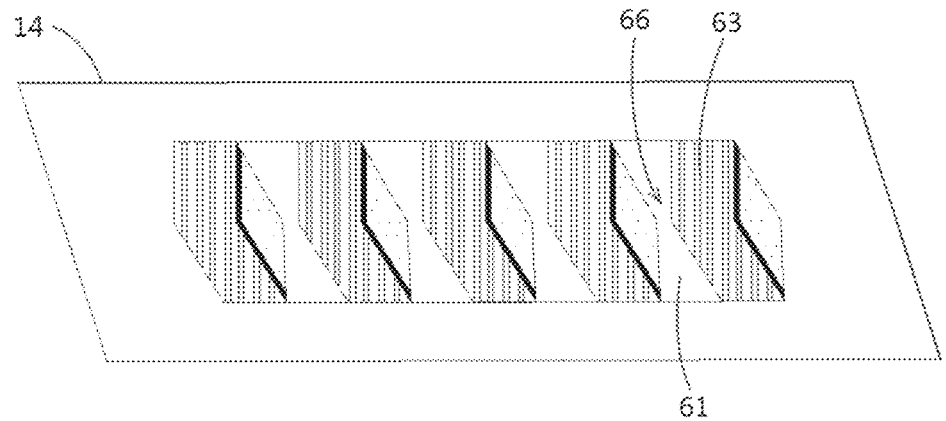
FIG. 4C is a schematic upward view of a first separator in FIG. 4A.
Figure 4D:
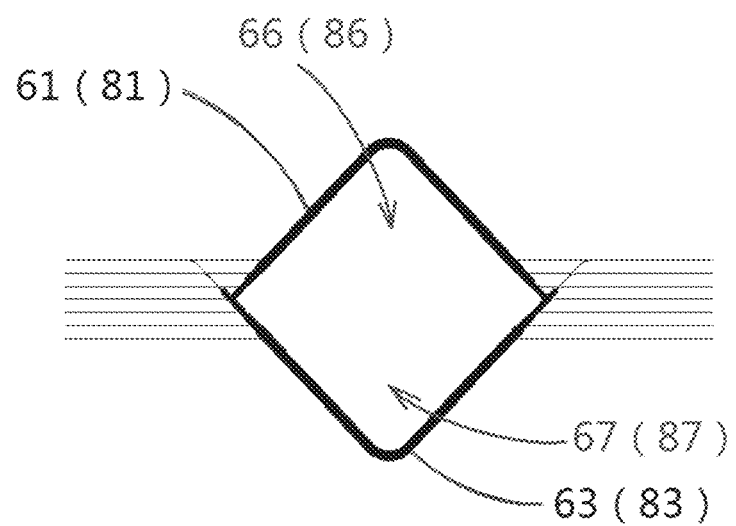
FIG. 4D is a cross-sectional view of the first protrusion in FIG. 4A.

In the embodiment shown in FIG. 3D, the first protrusions 61 and the second protrusions 81 have a triangular cross-section in a plane perpendicular to the length direction of the cell.

Embodiment 2

Referring to FIG. 4A to FIG. 4D, the first meshing structure 146 of the first separator 14 further includes third protrusions 63 and third receiving spaces 67, the third receiving spaces 67 are formed on a back surface of the third protrusions 63, which is different from the embodiment shown in FIG. 3A to FIG. 3D. In some embodiments, a plurality of first protrusions 61 and a plurality of third protrusions 63 have the same shape and same size. Correspondingly, the second meshing structure 148 of the second separator 15 further includes fourth protrusions 83 and fourth receiving spaces 87, the fourth receiving spaces 87 are formed on a back surface of the fourth protrusions 83. A convex direction of the first protrusions 61 is opposite to a convex direction of the third protrusions 63 of the first separator 14, a convex direction of the second protrusions 81 is opposite to a convex direction of the fourth protrusions 83 of the second separator 15. The third protrusions 63 of the first separator 14 is meshed with the fourth receiving spaces 87 of the second separator 15 located below the first separator 14. In the present embodiment, since the first protrusions 61 and the third protrusions 63 of the first meshing structure 146 are convex toward opposite directions respectively, such a structure may also be referred to as a bi-directional meshing structure.

In the present embodiment, the first protrusions 61 and the third protrusions 63 have a triangular cross-section in a plane perpendicular to the length direction of the cell. In an embodiment, adjacent first protrusion 61 and third protrusion 63 abuts each other, and the openings 69 are formed between the first protrusion 61 and the adjacent third protrusion 63.

In the present embodiment, with regard to the arrangement of the first protrusions 61 and the third protrusions 63, the third protrusions 63 are disposed between any two adjacent first protrusions 61. It should be understood that other configuration for the arrangement of the first protrusions 61 and the third protrusions 63 may be made according to actual application.

Embodiment 3

Figure 5:
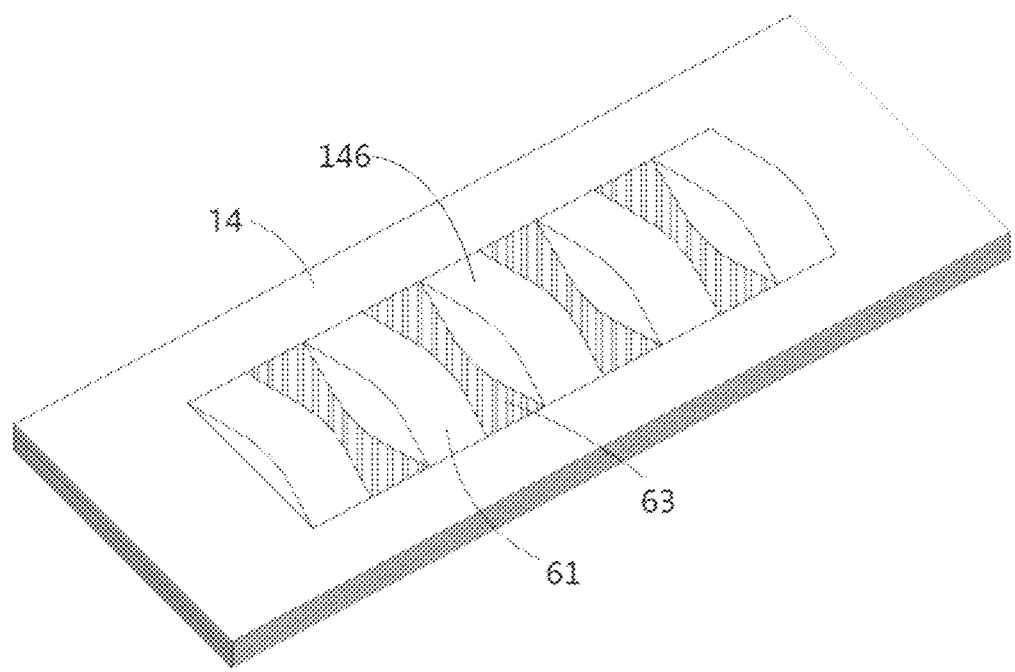
FIG. 5 to FIG. 11 are perspective views of meshing structures of a cell according to various embodiments of the present application.

Referring to FIG. 5, the first meshing structure 146 includes the first protrusions 61 and the third protrusions 63. In the present embodiment, the first protrusions 61 and the third protrusions 63 have an arc cross-section in the length direction of the cell. In the present embodiment, the opening may not be formed between the first protrusions 61 and the first separator 14, the opening may not be formed between the third protrusions 63 and the first protrusion 61. The second meshing structure of the second separator is configured as same as the first meshing structure 146. Other aspects of embodiment 3 are similar to those of embodiment 1 and embodiment 2, and are not described herein again.

Embodiment 4

Figure 6:
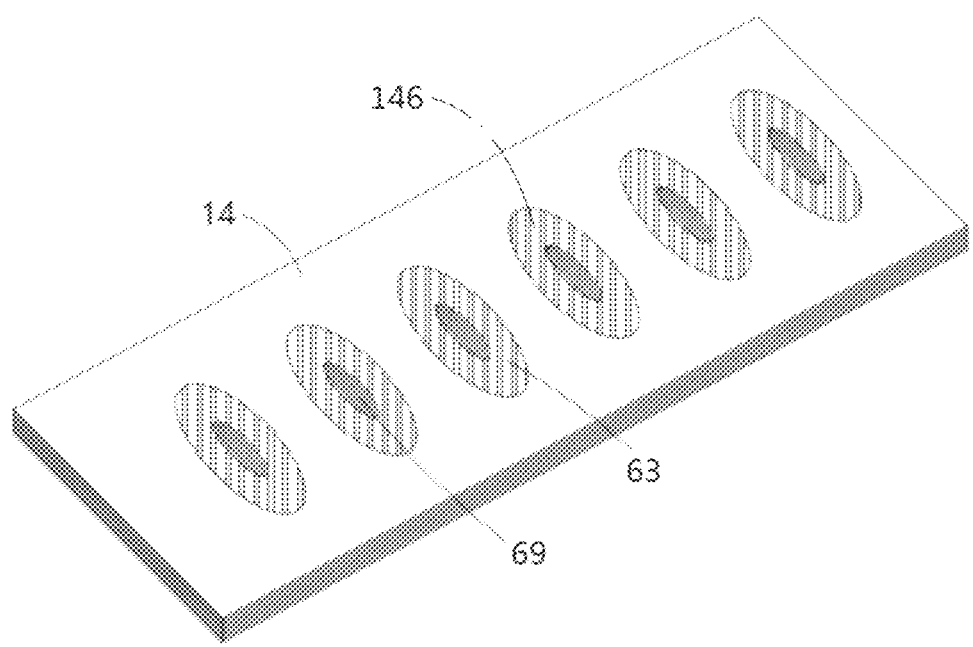

Referring to FIG. 6, the first meshing structure 146 includes the third protrusions 63 that protrudes from the plane where the first separator 14 is located. In the present embodiment, the third protrusions 63 are convex downward. In the present embodiment, the plurality of third protrusions 63 have a circular cross-section in a plane perpendicular to the thickness direction of the cell. In an embodiment, the openings 69 are formed on the top of the third protrusions 63. The plurality of openings 69 have a circular cross-section. The second meshing structure of the second separator is configured as same as the first meshing structure 146. Other aspects of embodiment 4 are similar to those of embodiment 1 and embodiment 2, and are not described herein again.

Embodiment 5

Figure 7:
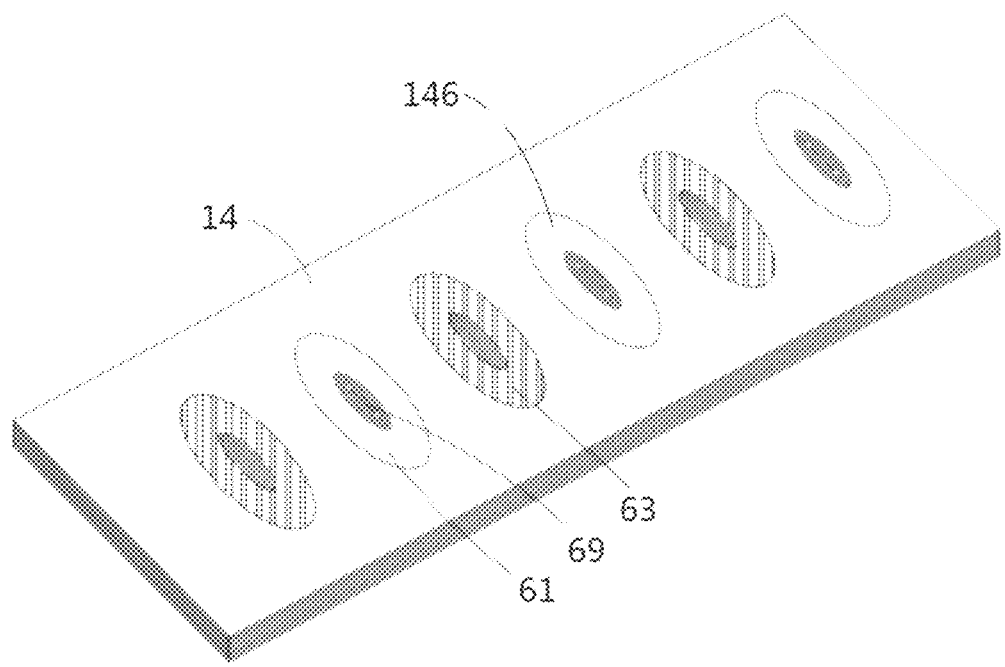

Referring to FIG. 7, the first meshing structure 146 includes the first protrusions 61 and the third protrusions 63. The convex directions of the first protrusion 61 and the third protrusion 63 are opposite. In the present embodiment, the first protrusions 61 and the plurality of third protrusions 63 have a circular cross-section in a plane perpendicular to the thickness direction of the cell. In an embodiment, the openings 69 are formed on the top of the first protrusions 61 and the third protrusions 63. The plurality of openings 69 have a circular cross-section. The second meshing structure of the second separator is configured as same as the first meshing structure 146. Other aspects of embodiment 5 are similar to those of embodiment 1 and embodiment 2, and are not described herein again.

Embodiment 6

Figure 8:
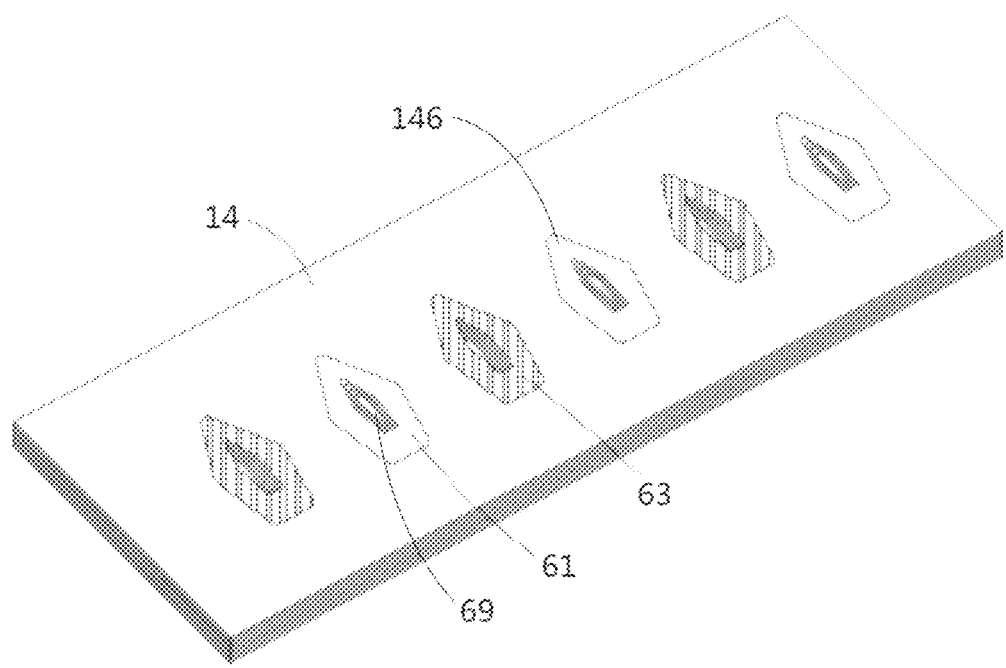

Referring to FIG. 8, the first meshing structure 146 includes the first protrusions 61 and the third protrusions 63. The convex directions of the first protrusion 61 and the third protrusion 63 are opposite. In the present embodiment, the first protrusion 61 and the plurality of third protrusions 63 have a polygonal cross-section, such as pentagonal, in a plane perpendicular to the thickness direction of the cell. In an embodiment, the openings 69 are formed on the top of the first protrusions 61 and the third protrusions 63. The plurality of openings 69 have a polygonal cross-section, such as pentagonal. The second meshing structure of the second separator is configured as same as the first meshing structure 146. Other aspects of embodiment 6 are similar to those of embodiment 1 and embodiment 2, and are not described herein again.

Embodiment 7

Figure 9:
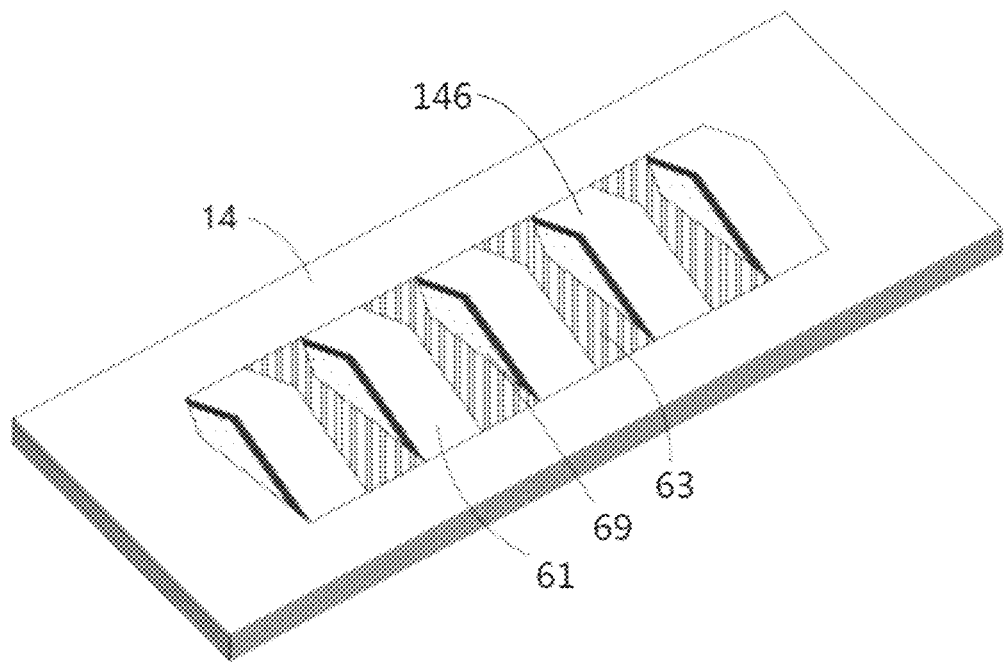

Referring to FIG. 9, the first meshing structure 146 includes the first protrusions 61 and the third protrusions 63. The convex directions of the first protrusion 61 and the third protrusion 63 are opposite. In the embodiment shown in FIG. 9, the first protrusions 61 and the second protrusions 63 have a triangular cross-section in a plane perpendicular to the length direction of the cell, the lengths of the two sides protruding from the plane where the separator is located are different in the triangular cross-section. In an embodiment, the first protrusion 61 and the adjacent third protrusion 63 abuts each other to form the opening 69. The second meshing structure of the second separator is configured as same as the first meshing structure 146. Other aspects of embodiment 7 are similar to those of embodiment 1 and embodiment 2, and are not described herein again.

Embodiment 8

Figure 10:
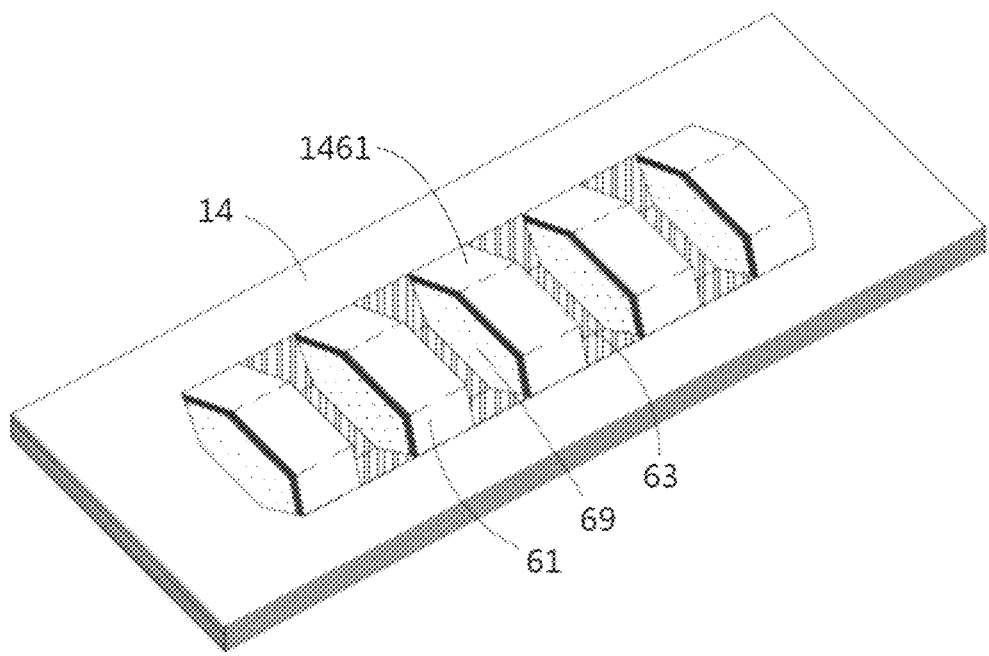

Referring to FIG. 10, the first meshing structure 146 includes the first protrusions 61 and the third protrusions 63, the convex directions of the first protrusion 61 and the third protrusion 63 are opposite. In the embodiment shown in FIG. 10, the first protrusions 61 and the third protrusions 63 have a trapezoidal cross-section in a plane perpendicular to the length direction of the cell. In present embodiment, the first protrusion 61 and the adjacent third protrusion 63 abuts each other to form the opening 69. The second meshing structure of the second separator is configured as same as the first meshing structure 146. Other aspects of embodiment 8 are similar to those of embodiment 1 and embodiment 2, and are not described herein again.

Embodiment 9

Figure 11:
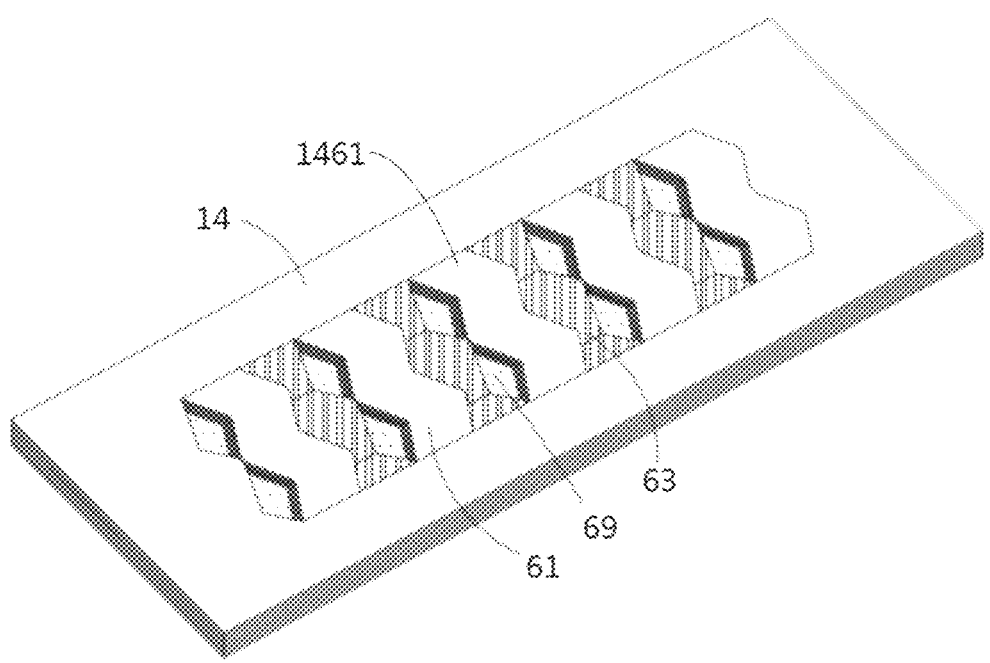

Referring to FIG. 11, the first meshing structure 146 includes the first protrusions 61 and the third protrusions 63, the convex directions of the first protrusions 61 and the third protrusions 63 are opposite. In the embodiment shown in FIG. 11, the first protrusions 61 and the third protrusions 63 have a zigzag cross-section in a plane perpendicular to the length direction of the cell. In present embodiment, the first protrusion 61 and the adjacent third protrusion 63 abuts each other to form the opening 69. Other aspects of embodiment 8 are similar to those of embodiment 1 and embodiment 2, and are not described herein again.

Performing drop test on twenty-five cells of embodiment 1 to embodiment 9, comparative example 1, and Comparative Example 2 to measure the voltage and to observe the shrinkage of the separator by disassemble. Wherein, the cell of comparative example 1 differs from embodiment 1 in that the portion of the separator in comparative example 1 that beyond the first electrode and the second electrode is not provided with the meshing structure; the cell of comparative example 2 differs from embodiment 1 in that the portion of the separator of the cell that beyond the first electrode and the second electrode in comparative example 2 is hot-pressed so that the separators are bonded to each other as much as possible.

The test conditions for the dropping test are: the charging state is 50% SOC, dropping height is 1.5 m, the six surfaces and four corners of the battery are dropped twice for one round, and a total of five rounds are performed. The test results obtained are shown in Table 1.

TABLE 1

Voltage and shrinkage of separator before and after the dropping test for the cells in Embodiments and Comparative Examples

|  | voltage OK ratio before dropping test | voltage OK ratio after dropping test | proportion of cells with shrinkage of separator | average number of separator with shrinkage per cell |
|---|---|---|---|---|
| embodiment 1 | 25/25 | 25/25 | 0/25 | 0 |
| embodiment 2 | 25/25 | 25/25 | 0/25 | 0 |
| embodiment 3 | 25/25 | 25/25 | 1/25 | 0.2 |
| embodiment 4 | 25/25 | 25/25 | 0/25 | 0 |
| embodiment 5 | 25/25 | 25/25 | 0/25 | 0 |
| embodiment 6 | 25/25 | 25/25 | 0/25 | 0 |
| embodiment 7 | 25/25 | 25/25 | 0/25 | 0 |
| embodiment 8 | 25/25 | 25/25 | 0/25 | 0 |
| embodiment 9 | 25/25 | 25/25 | 0/25 | 0 |
| comparative example 1 | 25/25 | 0/25 | 25/25 | 6.8 |
| comparative example 2 | 25/25 | 0/25 | 25/25 | 3.4 |

From the comparative results in Table 1, it can be seen that compared with comparative examples 1 and 2, the cell provided by the present application may effectively improve the dropping performance of the cell.

According to another aspect of the present application, the present application further provides a battery including the cell 10 above, a package sealed outside the cell, and an electrolyte filled inside the package.

Since the cell 10 as described above is formed in the battery, the battery also has all the advantages and effects as described above.

The foregoing is merely illustrative of the preferred embodiments of the present application and is not intended to be limiting of the present application, any modifications, equivalent substitutions, improvements, and the like within the spirit and principles of the application are intended to be included within the scope of the present application.

What is claimed is:

1. A cell, comprising:
   a first electrode;
   a second electrode;
   a first separator and a second separator disposed between the first electrode and the second electrode;
   wherein the first separator comprises a first meshing structure at a peripheral area beyond the first electrode and the second electrode, the second separator comprises a second meshing structure at the peripheral area beyond the first electrode and the second electrode; and the first meshing structure is meshed with the second meshing structure along a thickness direction of the cell;
   wherein the first meshing structure comprises a first protrusion and a first receiving space, and the first receiving space is formed on a back surface of the first protrusion;
   the second meshing structure comprises a second protrusion and a second receiving space, and the second receiving space is formed on a back surface of the second protrusion; and
   the second protrusion is meshed with the first receiving space, or the first protrusion is meshed with the second receiving space.

2. The cell according to claim 1, wherein the first meshing structure further comprises a third protrusion and a third receiving space, and the third receiving space is formed on a back surface of the third protrusion;
   the second meshing structure further comprises a fourth protrusion and a fourth receiving space, and the fourth receiving space is formed on a back surface of the fourth protrusion; and
   the third protrusion is meshed with the fourth receiving space.

3. The cell according to claim 2, wherein a convex direction of the first protrusion is opposite to a convex direction of the third protrusion.

4. The cell according to claim 2, wherein a convex direction of the second protrusion is opposite to a convex direction of the fourth protrusion.

5. The cell according to claim 2, wherein the third protrusion is disposed between two adjacent first protrusions.

6. The cell according to claim 1, wherein an opening is formed between the first protrusion and the first separator.

7. The cell according to claim 1, wherein an opening is formed on a top of the first protrusion.

8. The cell according to claim 7, wherein a plurality of openings have a cross-section shape of circular.

9. The cell according to claim 7, wherein a plurality of openings have a cross-section shape of polygonal.

10. The cell according to claim 7, wherein,
    the first electrode is a positive electrode and the second electrode is a negative electrode; or
    the first electrode is a negative electrode and the second electrode is a positive electrode.

11. The cell according to claim 1, wherein the first meshing structure has a first maximum thickness; the first separator has a third thickness at where not provided with the first meshing structure; and the first maximum thickness is less than the third thickness.

12. The cell according to claim 1, wherein the second meshing structure has a second maximum thickness; the second separator has a third thickness at where not provided with the second meshing structure; and the second maximum thickness is less than the third thickness.

13. The cell according to claim 1, wherein the first protrusion and the second protrusion have a cross-sectional shape of any one of a circle shape and a polygon shape in a plane perpendicular to the thickness direction of the cell.

14. The cell according to claim 1, wherein the first protrusion and the second protrusion have a cross-sectional shape of any one of a triangle shape, a trapezoidal shape, a zigzag shape, and an arc shape in a plane perpendicular to a length direction of the cell.

15. The cell according to claim 1, wherein the first meshing structure is disposed discontinuously along a length direction of the cell.

16. The cell according to claim 1, wherein the first meshing structure is disposed continuously along a length direction of the cell.

17. The cell according to claim 1, wherein a plurality of first protrusions have the same shape and same size.

18. The cell according to claim 1, wherein a plurality of first protrusions are convex in a same direction.

19. A battery, comprising a package, an electrolyte and a cell comprising:
- a first electrode;
- a second electrode;
- a first separator and a second separator disposed between the first electrode and the second electrode;
- wherein the first separator comprises a first meshing structure at a peripheral area beyond the first electrode and the second electrode, the second separator comprises a second meshing structure at the peripheral area beyond the first electrode and the second electrode; and the first meshing structure is meshed with the second meshing structure along a thickness direction of the cell;
- wherein the first meshing structure comprises a first protrusion and a first receiving space, and the first receiving space is formed on a back surface of the first protrusion;
- the second meshing structure comprises a second protrusion and a second receiving space, and the second receiving space is formed on a back surface of the second protrusion; and
- the second protrusion is meshed with the first receiving space, or the first protrusion is meshed with the second receiving space.

* * * * *